Oct. 3, 1961 G. WOLFF 3,003,145
INDUCTIVE DIGITAL ENCODERS
Filed Sept. 3, 1959

INVENTOR.
BY Gunther Wolff

3,003,145
INDUCTIVE DIGITAL ENCODERS
Gunther Wolff, Westport, Conn., assignor to Machine Tool Automation, Inc., Southport, Conn.
Filed Sept. 3, 1959, Ser. No. 837,850
3 Claims. (Cl. 340—347)

This invention relates to improvements in the design of inductive digital encoders (the latter disclosed in United States Patent 2,942,252, dated June 21, 1960. More specifically the invention relates to an improved digital encoder which is employed to convert the position of a member in space into electrically coded, numerical values; furthermore mechanical-electrical transducing is accomplished by a two winding stationary pick-off core in conjunction with a magnetically codified movable member.

Inductive digital encoders as disclosed in the above referenced application perform well unless a considerable amount of resolution in a small unit is desired. It then becomes difficult to provide a sufficiently narrow pick-off core and still maintain an acceptable signal-to-noise ratio, as well as a large signal output level.

It is therefore an object of this invention to provide an inductive digital encoder capable of high resolution and of small size.

It is a further object of this invention to provide an inductive digital encoder capable of yielding a large signal output level even for high resolution and small size.

One feature of the invention is to provide a plurality of narrow pick-off cores, all surrounded by common exciting and pick-off coils and separated by a distance equal to approximately one quantum. This feature permits the maintaining of a sufficient magnetic area at the air gap for high total flux flow despite the narrowing down of each individual pick-off core. Furthermore this objective is achieved without presenting large additional surfaces from which magnetic leakage to the surrounding metal could take place.

Another feature of the invention is to provide a magnetic shield around the pick-off coils so as to minimize leakage off the pick-off core by creating a magnetically equi-potential surface near said core.

Another feature of the invention is to provide electrically conductive material at the tip of the cores and adjacent to said cores, so as to minimize leakage flux by creating an area of high magnetic reluctance as a consequence of the eddy currents in said electrically conductive portions.

The above as well as other objects and novel features of the invention will become apparent from the following specification and accompanying drawings in which.

Figure 1:
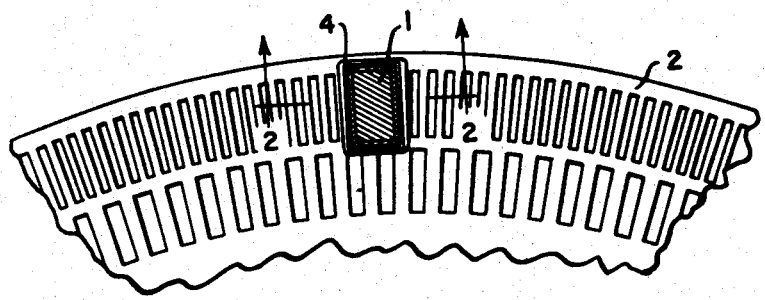
FIGURE 1 is a partial plan view of the codified movable member of an inductive digital encoder to which the principles of the improvements of this invention have been applied.
Figure 2:
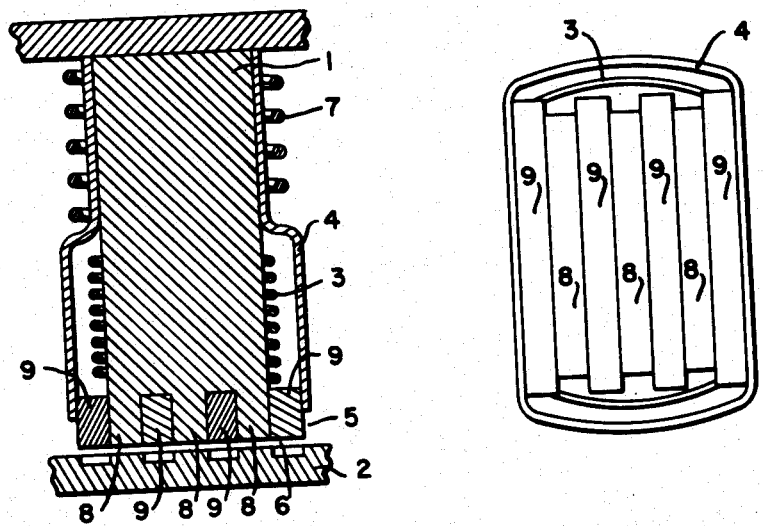
FIGURE 2 is a sectional elevation view taken along line 2—2 of FIGURE 1.
Figure 3:
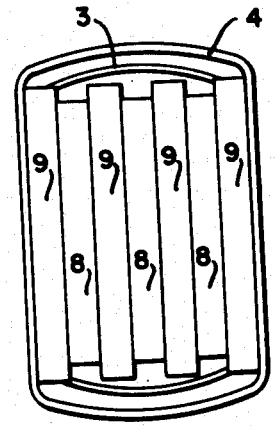
FIGURE 3 is a bottom view thereof.

Referring to FIGURES 1-3, and particularly to FIG-URE 2, the pick-off core 1 is several quanta wide, as becomes apparent from the fact that more than one raised portion of the codified movable member 2 is subtended by the outer confines of said pick-off core 1. The tip portion of said pick-off core 1 is, however, slotted so as to result in intimate magnetic contact between movable member and core only for each quantum of rotation of the movable member. It is permissible to repeat such pick-off projections at points of redundancy on the codified movable member because of the repetitiveness of digital codes.

FIGURE 2 further shows a pick-off coil 3 which may extend for a considerable distance parallel to the pick-off core. Said pick-off coil is surrounded by a magnetic shield 4 which is prevented from conducting any appreciable flux to the codified movable member by means of the air gap 5 which is large compared to the main air gap 6. The shield 4 is essentially at the same magnetic potential as the core 1 since they are both subject to the exciting coil 7. Thus little magnetic flux flows from core 1 to shield 4 and therefore the undesired voltage induced in pick-off coil 3 due to such leakage flux is minimized.

Each pick-off projection 8 is surrounded on its two long sides by bars of electrically conductive material 9. Any flux that would tend to leak from pick-off core to the codified movable member through these said electrically conductive bars would induce an eddy current in said bars. This eddy current would set up a counter magneto-motive force which would tend to reduce the flux.

What is claimed is:
1. In an inductive digital encoder, signal sensing means comprising inductively related exciting and pick-off coils whose inductive relation is varied by a movable magnetic member; and a magnetic shield extending from inside said exciting coil to outside said pick-off coil.
2. In an inductive digital encoder signal sensing means comprising inductively related exciting and pick-off coils wound over a core with a plurality of projections near its tip and electrically conducting bars adjacent to and substantially coextensive with the width of the projections on said pick-off core, the inductive relation of said exciting and pick-off coils being varied by a movable magnetic member.
3. In an inductive digital encoder signal sensing means comprising inductively related exciting and pick-off coils wound over a core with a plurality of projections near its tip; a magnetic shield extending from inside said exciting coil to outside said pick-off coil; and electrically conducting bars adjacent to and substantially coextensive with the width of the projections on said pick-off core, the inductive relation of said exciting and pick-off coils being varied by a movable magnetic member.

References Cited in the file of this patent
UNITED STATES PATENTS

| | | |
|---|---|---|
| 2,658,114 | Buhrendorf | Nov. 3, 1953 |
| 2,822,533 | Duinker | Feb. 4, 1958 |
| 2,905,874 | Kelling | Sept. 22, 1959 |
| 2,923,779 | Katz | Feb. 2, 1960 |